United States Patent
Elgh (10) Patent No.: US 10,744,927 B2
(45) Date of Patent: Aug. 18, 2020

(54) HEADLIGHT ASSEMBLY FOR A MOWER (71) Applicant: HUSQVARNA AB, Huskvarna (SE)

(72) Inventor: David Elgh, Huskvarna (SE)

(73) Assignee: HUSQVARNA AB, Huskvarna (SE)

(*) Notice: Subject to any disclaimer, the term of this patent is extended or adjusted under 35 U.S.C. 154(b) by 0 days.

(21) Appl. No.: 16/421,644

(22) Filed: May 24, 2019

(65) Prior Publication Data

US 2019/0359116 A1 Nov. 28, 2019

(30) Foreign Application Priority Data

May 28, 2018 (SE) ...................................... 1850637

(51) Int. Cl.
| | |
|---|---|
| B60Q 1/04 | (2006.01) |
| F21S 41/26 | (2018.01) |
| F21S 41/141 | (2018.01) |
| F21S 41/29 | (2018.01) |
| F21S 41/00 | (2018.01) |
| B60Q 1/24 | (2006.01) |
| F21S 41/143 | (2018.01) |
| B60Q 1/00 | (2006.01) |
| F21S 41/20 | (2018.01) |
| F21S 41/151 | (2018.01) |
| F21S 41/19 | (2018.01) |

(Continued)

(52) U.S. Cl.
CPC .......... B60Q 1/0408 (2013.01); A01D 75/00 (2013.01); B60Q 1/0041 (2013.01); B60Q 1/04 (2013.01); B60Q 1/24 (2013.01); F21S 41/00 (2018.01); F21S 41/141 (2018.01); F21S 41/143 (2018.01); F21S 41/151 (2018.01); F21S 41/19 (2018.01); F21S 41/26 (2018.01); F21S 41/285 (2018.01); F21S 41/29 (2018.01); F21V 33/00 (2013.01); A01D 2101/00 (2013.01); F21Y 2115/10 (2016.08)

(58) Field of Classification Search
CPC .... B60Q 1/0408; F21S 41/26; A01D 2101/00
See application file for complete search history.

(56) References Cited

U.S. PATENT DOCUMENTS

| | | |
|---|---|---|
| 1,961,836 A | 6/1934 | Warner |
| 4,758,932 A | 7/1988 | Coons |

(Continued)

FOREIGN PATENT DOCUMENTS

| | | |
|---|---|---|
| CN | 205842451 U | 12/2016 |
| EP | 3106347 A1 | 12/2016 |
| FR | 2857559 A1 | 1/2005 |

OTHER PUBLICATIONS

Husqvarna, "Husqvarna Zero Turn Custom Led Highlights," Published on Sep. 14, 2014, Retreived from URL: https://www.youtube.com/watch?v=Rd6_BGir6ag, p. 1.

(Continued)

Primary Examiner — William N Harris
(74) Attorney, Agent, or Firm — Burr & Forman, LLP (57) ABSTRACT A headlight assembly (126) for a mower (100) includes a cover member (302) defining an aperture (306). A first light source (308) is at least partially received within the aperture (306). The first light source (308) illuminates a first area (202) in front of the mower (100). A second light source (408) is coupled to the cover member (302). The second light source (408) illuminates a second area (204) extending at least partially around the mower (100).

20 Claims, 6 Drawing Sheets (51) Int. Cl.
    *A01D 75/00*     (2006.01)
    *F21V 33/00*     (2006.01)
    *F21Y 115/10*    (2016.01)
    *A01D 101/00*    (2006.01)

(56) References Cited

U.S. PATENT DOCUMENTS

| | | | |
|---|---|---|---|
| 5,067,055 | A | 11/1991 | Farnsworth |
| 6,447,152 | B1 | 9/2002 | Goebert |
| D482,148 | S * | 11/2003 | Arthur .......................... D26/28 |
| D509,923 | S * | 9/2005 | Arthur ........................ D26/139 |
| D546,351 | S * | 7/2007 | Arthur .......................... D15/31 |
| 7,380,391 | B2 | 6/2008 | Kieffer et al. |
| 8,061,868 | B2 | 11/2011 | Dubord |
| 8,608,356 | B1 | 12/2013 | McGean |
| 9,925,913 | B2 * | 3/2018 | Kudou .................... B60Q 1/04 |
| 2003/0213220 | A1 | 11/2003 | Hornung |
| 2014/0007551 | A1 | 1/2014 | Walden et al. |
| 2016/0185275 | A1 * | 6/2016 | Kawashiri ................ B60Q 1/18 |
| | | | 362/549 |
| 2018/0156407 | A1 * | 6/2018 | Lee .................... H05B 33/0803 |

OTHER PUBLICATIONS

International Type Search Report for Swedish Application No. 1850637-8 dated Jan. 2, 2019.
JDMTOY.com Automotive LED, "Ultra Thin Audi Style Side Glow Dual Color Switchback Flexible LED Strip Lights," https://www.youtube.com/watch?v=AY_fNIVfbxM, Mar. 9, 2012.
Cartzar, "(Old Tutorial)how to install leds inside headlight," https://www.youtube.com/watch?v=sbSDj48WcPI, Oct. 14, 2011.

* cited by examiner

HEADLIGHT ASSEMBLY FOR A MOWER

TECHNICAL FIELD

The present disclosure relates to a mower. More specifically, the present disclosure relates to a headlight assembly for a mower.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers, such as walk-behind lawn mowers, riding lawn mowers, etc. Riding lawn mowers can sometimes also be configured with various functional accessories (e.g., trailers, tillers etc.) in addition to grass cutting components. Riding lawn mowers provide the convenience of a riding vehicle as well as a typically larger cutting deck as compared to a walk-behind mower.

While working with a riding lawn mower, it may be vital that a working area in front of and around the lawn mower is clearly visible to a user. Riding lawn mowers typically use a headlight assembly to illuminate the working area in front of the lawn mower. The working area in front of the lawn mower needs to be illuminated, as the user should know an extent of cutting operation to be performed. Also, as the cutting apparatus typically extends sideways on both sides of the riding lawn mower, the user should be aware of any obstacles or objects that may hinder efficient functioning of the mower.

Therefore, there is a need for the riding lawn mower to be equipped with adequate working area illuminating means to allow the operator to operate the riding lawn mower efficiently.

SUMMARY OF THE DISCLOSURE

In an example embodiment, a headlight assembly for a mower is provided. The headlight assembly includes a cover member defining an aperture. The headlight assembly includes a first light source which is at least partially received within the aperture. The first light source illuminates a first area in front of the mower. The headlight assembly further includes a second light source coupled to the cover member. The second light source illuminates a second area extending at least partially around the mower.

In another example embodiment, a mower is provided. The mower includes a chassis, and a cutting apparatus movably coupled to the chassis. The mower includes a frame coupled to the chassis, and a headlight assembly coupled to the frame. The headlight assembly includes a cover member defining an aperture. The headlight assembly includes a first light source which is at least partially received within the aperture. The first light source illuminates a first area in front of the mower. The headlight assembly further includes a second light source coupled to the cover member. The second light source illuminates a second area at least partially around the mower.

In still another example embodiment, a headlight assembly for a mower is provided. The headlight assembly includes a cover member defining an aperture. The headlight assembly includes a first light source which is at least partially received within the aperture. The first light source illuminates a first area in front of the mower. The headlight assembly includes a second light source coupled to the cover member. The second light source illuminates a second area at least partially around the mower. The headlight assembly further includes a lens mounted to the cover member such that the lens covers the second light source.

Some example embodiments may enhance illumination of a working area of a mower by providing an improved headlight assembly for the mower. A user experience of operating the mower may thus be improved.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may enhance illumination of a working area in front of and around a vehicle, such as a riding lawn mower, by employing an improved headlight assembly. Accordingly, various illumination patterns may be offered to operate the vehicle as per ambient lighting situations.

Figure 1:
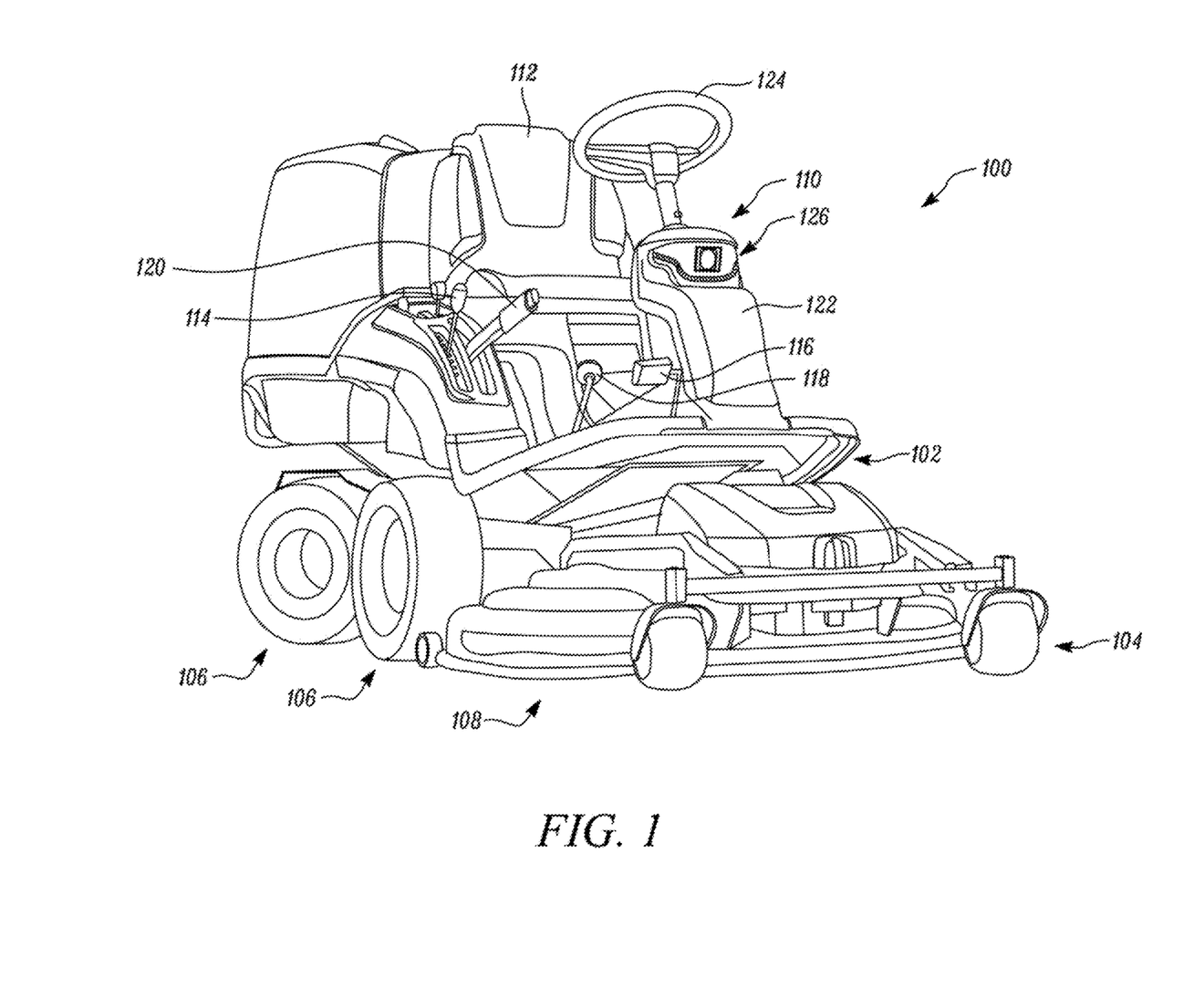
FIG. 1 illustrates a perspective view of a mower, according to an example embodiment.

FIG. 1 illustrates a perspective view of a mower 100. The mower 100 is illustrated as a riding type mower. However, it should be contemplated that the mower 100 may be any other type of mower, or lawn care vehicle as well. The present disclosure is not limited by type of mower in any manner. The mower 100 includes a chassis 102 supported over two pairs of rear wheels 106. The mower 100 may include fewer or more pairs of rear wheels 106 as per the need of application area for which the mower 100 is to be used for.

The mower 100 includes a cutting apparatus 108 movably coupled to the chassis 102. The cutting apparatus 108 is located underneath the chassis 102. A pair of front wheels 104 supports the cutting apparatus 108. The cutting apparatus 108 may include at least one cutting blade (not visible) mounted within the cutting apparatus 108 such that the mower 100 may perform a cutting operation. The cutting apparatus 108 may move between an operational position and a stowed position. The cutting blade may perform the cutting operation in the operational position and may be stored in the stowed position.

The mower 100 includes an operator platform 110 mounted on the chassis 102. The operator platform. 110 has an operator seat 112 for an operator to sit upon while operating the mower 100. The operator platform 110 may also provide space for the operator to stand while operating the mower 100. The operator platform 110 further includes controls for the operator to control the mower 100. The controls include a gear shift lever 114, an accelerator pedal 116, a brake pedal 118, a parking brake lever 120, etc. The controls may include other such components as well which may be necessary to operate the mower 100.

The mower 100 includes a frame 122 coupled to the chassis 102. The frame 122 may extend vertically upwards from chassis 102 to a suitable height from where the operator can access the frame 122 ergonomically. A steering wheel 124 is coupled to the frame 122 for maneuvering the mower 100 as desired. The operator may rotate the steering wheel 124 to steer the mower 100 in a desired direction.

Figure 2:
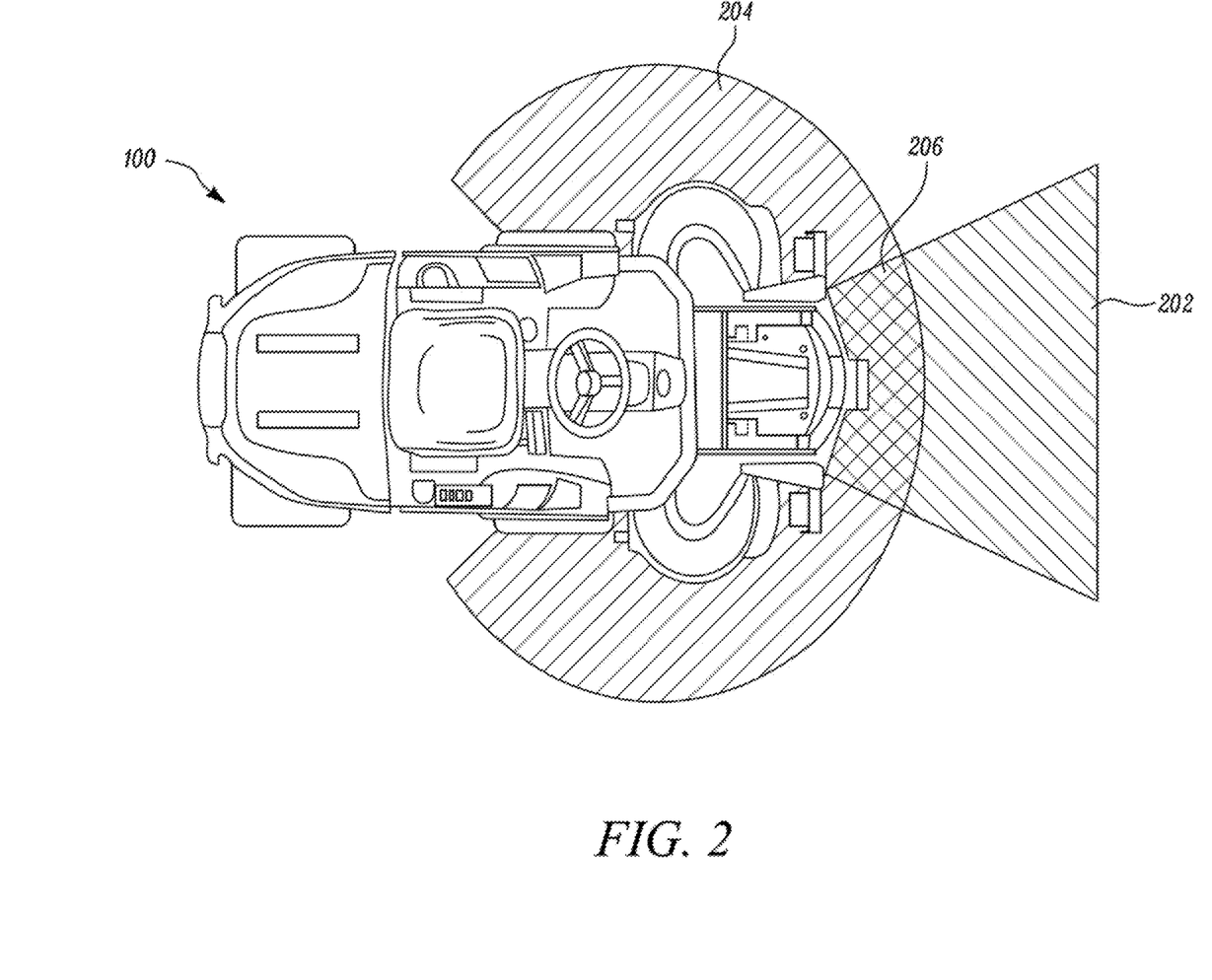
FIG. 2 illustrates a top view of the mower, according to an example embodiment.

The mower 100 further includes a headlight assembly 126 coupled to the frame 122. The headlight assembly 126 illuminates a working area for the mower 100. FIG. 2 shows a top view of the mower 100 and illustrates a working area relative to the mower 100. The working area is defined as a combination of a first area 202 and a second area 204. The first area 202 is defined in front of the mower 100. The second area 204 extends at least partially around the mower 100. The second area 204 extends in an angular range around the mower 100. In the illustrated embodiment, the angular range is greater than 180 degrees. However, it should be contemplated that the angular range may have any other suitable value as well. The present disclosure is not limited by extent of angular range in any manner. The first area 202 and the second area 204 share an extent of overlap as illustrated by a cross-shaded portion 206. The first area 202 and the second area 204 are illuminated by the headlight assembly 126.

Figure 3:
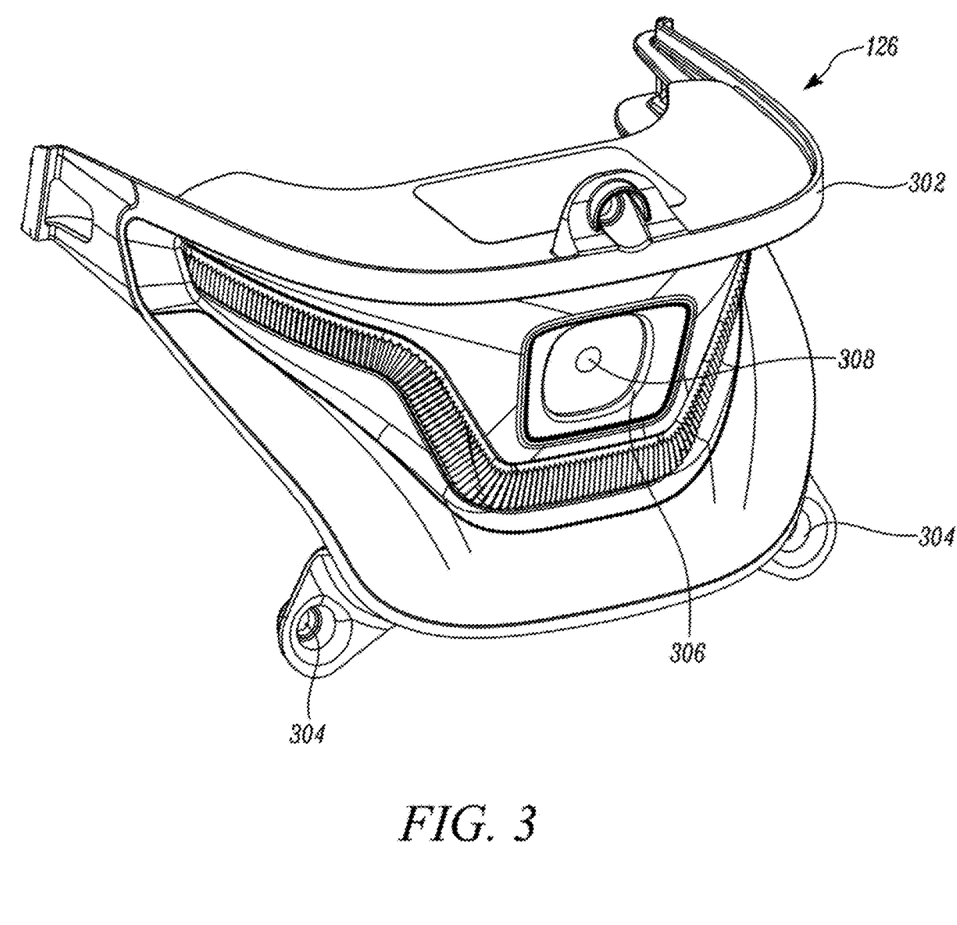
FIG. 3 illustrates a perspective view of a headlight assembly for the mower, according to an example embodiment.

FIG. 3 illustrates a perspective view of the headlight assembly 126. The headlight assembly 126 includes a cover member 302. The cover member 302 may be made up of a plastic material, a polymer, or any other type of a suitable material. The cover member 302 includes holes 304 for receiving fasteners (not shown) which may be used to couple the cover member 302 with the frame 122 of the mower 100. The frame 122 may include appropriate recesses (not shown) to accommodate the headlight assembly 126.

The cover member 302 defines an aperture 306 to at least partially receive a first light source 308 within the aperture 306. In an embodiment, the cover member 302 fully receives the first light source 308 within the aperture 306. The first light source 308 illuminates the first area 202. The first light source 308 may be a lamp. In an embodiment, the first light source 308 is a high beam lamp which may provide high intensity light to illuminate the first area 202. It should be contemplated that the first light source 308 may be any other type of a suitable light source as well.

Figure 4:
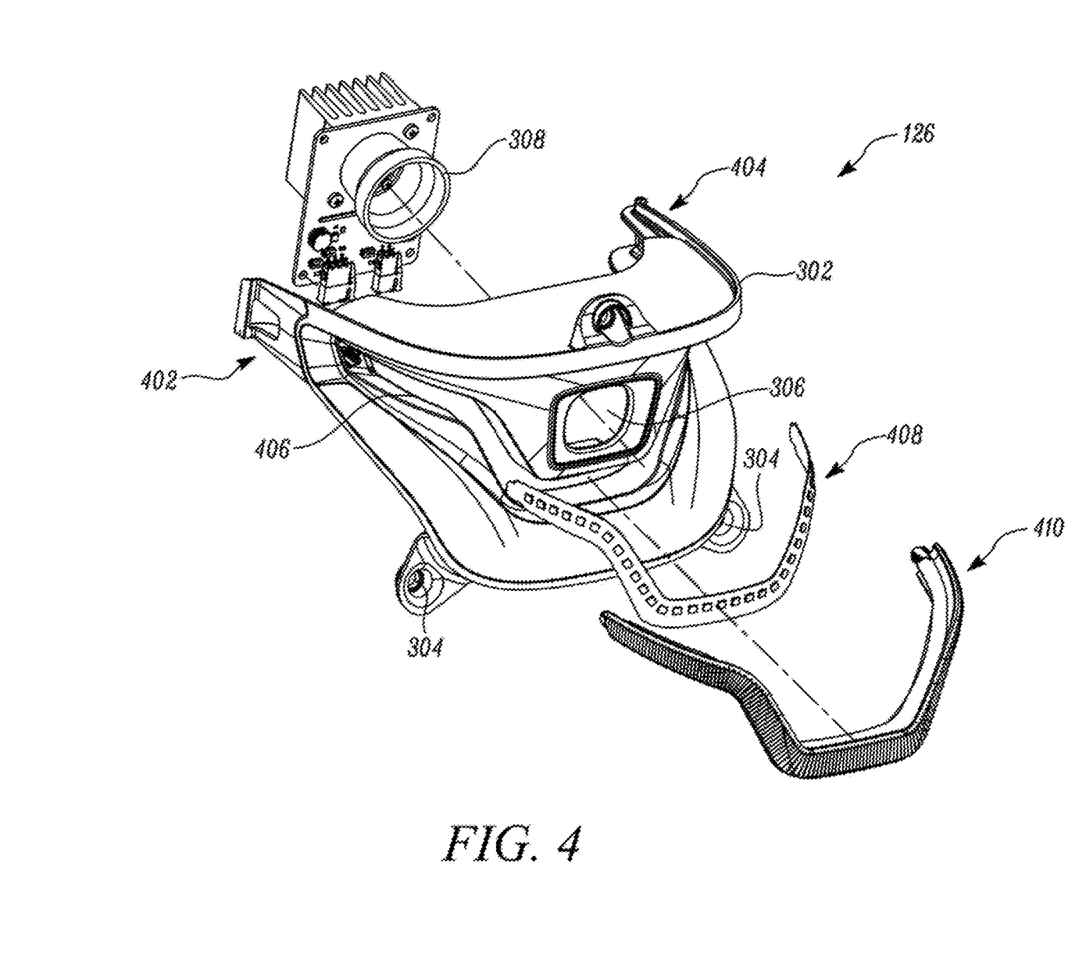
FIG. 4 illustrates an exploded view of the headlight assembly, according to an example embodiment.

FIG. 4 shows an exploded view of the headlight assembly 126 such that various internal components of the headlight assembly 126 are visible. The cover member 302 has a first end 402 and a second end 404. The cover member 302 defines a mounting recess 406 extending between the first end 402 and the second end 404. The headlight assembly 126 further includes a second light source 408 and a lens 410 covering the second light source 408. The second light source 408 and the lens 410 are received within the mounting recess 406. The second light source 408 illuminates the second area 204.

Figure 5A:
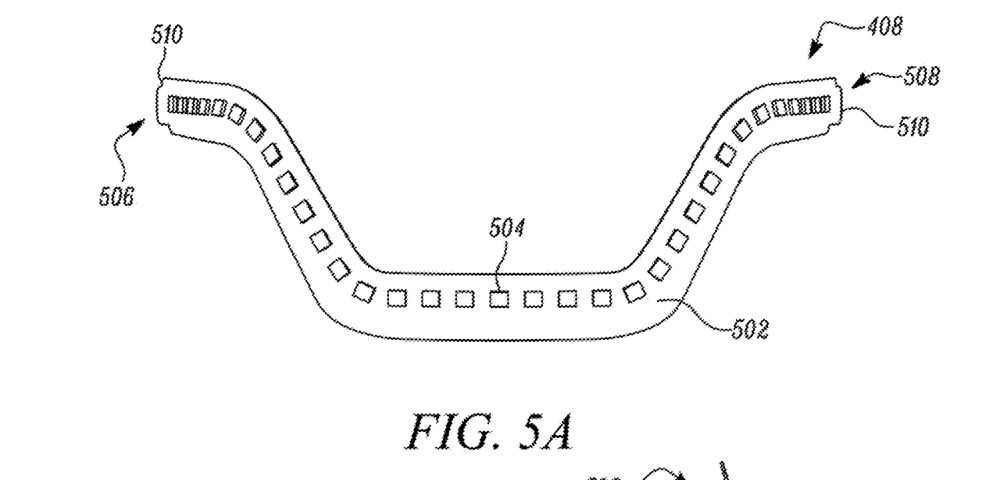
FIG. 5A illustrates a front view of a printed circuit board (PCB) having light emitting diodes mounted on the PCB, according to an example embodiment.
Figure 5B:
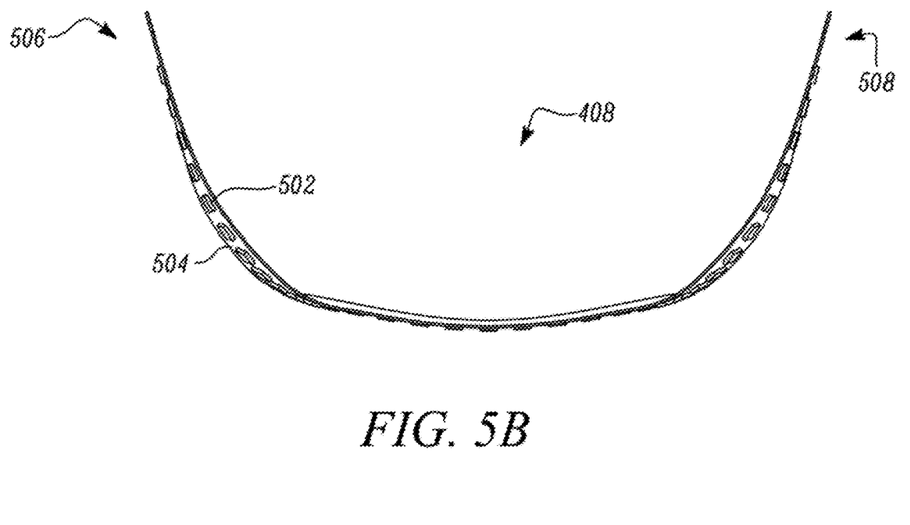
FIG. 5B illustrates a top view of a printed circuit board (PCB) having light emitting diodes mounted on the PCB, according to an example embodiment.

FIGS. 5A and 5B show a front view and a top view of the second light source 408 respectively. Referring to FIGS. 5A and 5B, the second light source 408 is illustrated as a printed circuit board (PCB) 502 having multiple light emitting diodes (LEDs) 504 mounted on the PCB 502. The PCB 502 may have a flexible structure so that the second light source 408 may be easily mounted on the cover member 302. In an embodiment, the LEDs 504 are mounted in a uniformly spaced apart manner on the PCB 502. In another embodiment, the LEDs 504 may be mounted in a non-uniformly spaced apart manner. In such an embodiment, LEDs 504 may have varying intensity along a length of the PCB 502. It should be contemplated that the present disclosure is not limited by arrangement of LEDs 504 on the PCB 502 in any manner.

The second light source 408 has a first end 506 and a second end 508. The second light source 408 has connection portions 510 coupled to the second light source 408 at the first end 506 and the second end 508. The connection portions 510 are received within the mounting recess 406 of the cover member 302 such that the second light source 408 is coupled with the cover member 302. The connection portions 510 may include holes (not shown) to receive fasteners to couple the second light source 408 with the cover member 302. The second light source 408 may be coupled to the cover member 302 through any other suitable joining method such as adhesives. The present disclosure is not limited by means of connection between the second light source 408 and the cover member 302.

Figure 6A:
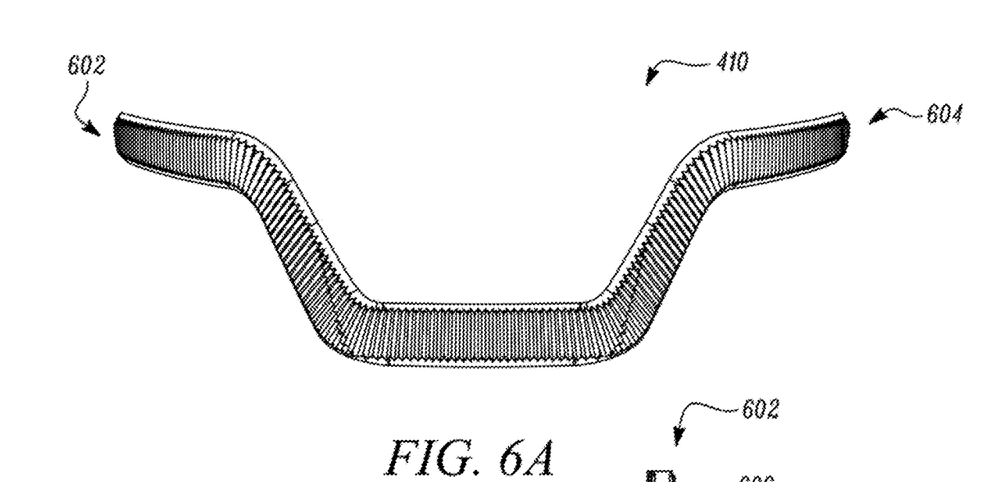
FIG. 6A illustrates a front view of a lens of the headlight assembly, according to an example embodiment.
Figure 6B:
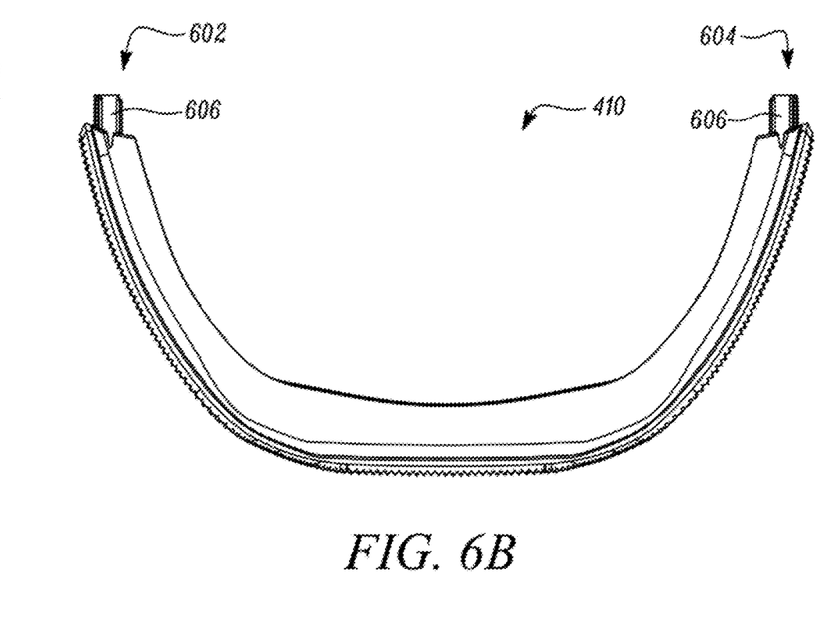
FIG. 6B illustrates a top view of the lens of the headlight assembly, according to an example embodiment.

FIGS. 6A and 6B show a front view and a top view of the lens 410 respectively. Referring to FIGS. 6A and 6B, the lens 410 is mounted on the cover member 302 such that the lens 410 covers the second light source 408. The lens 410 may magnify light emitted by the second light source 408 and uniformly distribute the light across the second area 204. The lens 410 may be made of glass, a plastic material, a polymer material, or any other suitable material. The present disclosure is not limited by choice of material of the lens 410 in any manner.

The lens 410 is illustrated as having a serrated structure which may help in distributing the light emitted by the second light source 408 uniformly across the second area 204. However, the lens 410 may have any other suitable structure as well. The lens 410 extends between a first end 602 and a second end 604. The first end 602 and the second end 604 include coupling portions 606 to couple the lens 410 with the cover member 302. The coupling portion 606 may be a hollowed recessed component which may be received on protrusions (not shown) on the mounting recess 406 defined by the cover member 302. The protrusions may have a dimension slightly smaller than the coupling portions 606 and may allow a press-fit connection between the lens 410 and the cover member 302. The lens 410 may be coupled to the cover member 302 by any other suitable joining means as well. The present disclosure is not limited by the type of joining means between the lens 410 and the cover member 302.

The headlight assembly 126 may further include a transparent shield (not shown) provided over the lens 410 to protect the components of the headlight assembly 126 from environmental factors, such as dust, moisture, insects, etc. The headlight assembly 126 may include any other essential components as well which may be suitable for application with various aspects of the present disclosure.

The headlight assembly 126 described by the present disclosure efficiently illuminates the first area 202 and the second, area 204. The mower 100 may be operated in various operational modes of the headlight assembly 126. A first operational mode may be defined by switching on the first light source 308 and keeping the second light source 408 in a switched off state. A second operational mode may be defined by switching on both the first light source 308 and the second light source 408. Further, a third operational mode may be defined by switching off both the first light source 308 and the second light source 408. The three operational modes may be utilized as per availability of ambient lighting to adequately supplement the lighting of the working area. A button, joystick, selector switch, a touchscreen, or any other such user interface may be provided to switch between the three operational modes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A headlight assembly for a mower, the headlight assembly comprising:
   a cover member defining an aperture, the cover member having a front portion, a first side extending from the front portion, and a second side, opposite the first side, also extending from the front portion, wherein the cover member further comprises a mounting recess that extends from the first side, across the front portion, to the second side;
   a first light source adapted to be at least partially received within the aperture, wherein the first light source is configured to illuminate a first area in front of the mower; and
   a second light source coupled to the cover member, the second light source being disposed within the mounting recess of the cover member and extending from the first side, across the front portion, to the second side of the cover member, wherein the second light source is configured to illuminate a second area extending at least partially around the mower.

2. The headlight assembly of claim 1, wherein the second area extends in an angular range of more than 180 degrees.

3. The headlight assembly of claim 1, wherein the mounting recess includes a curved portion that curves around a lower side of the aperture.

4. The headlight assembly of claim 1, wherein the second light source comprises a printed circuit board (PCB) having a flexible structure allowing the second light source to be mounted within the mounting recess and is contoured along a length of the mounting recess from the first side, to the front portion, to the second side.

5. The headlight assembly of claim 4, wherein the second light source comprises light-emitting diodes (LEDs) mounted to the PCB.

6. The headlight assembly of claim 1, further comprising a lens mounted to the cover member such that the lens is received into the mounting recess and covers the second light source.

7. The headlight assembly of claim 6, wherein the lens does not cover the aperture.

8. A mower comprising:
   a chassis;
   a cutting apparatus movably coupled to the chassis;
   a frame coupled to the chassis; and
   a headlight assembly coupled to the frame, the headlight assembly comprising:
      a cover member defining an aperture, the cover member having a front portion, a first side extending from the front portion, and a second side, opposite the first side, also extending from the front portion, wherein the cover member further comprises a mounting recess that extends from the first side, across the front portion, to the second side;
      a first light source adapted to be at least partially received within the aperture, wherein the first light source is configured to illuminate a first area in front of the mower; and
      a second light source coupled to the cover member, the second light source being disposed within the mounting recess of the cover member and extending from the first side, across the front portion, to the second side of the cover member, wherein the second light source is configured to illuminate a second area at least partially around the mower.

9. The mower of claim 8, wherein the second area extends in an angular range of more than 180 degrees.

10. The mower of claim 8, wherein the first light source comprises a lamp.

11. The mower of claim 8, wherein the second light source comprises a printed circuit board (PCB) having a flexible structure allowing the second light source to be mounted within the mounting recess and is contoured along a length of the mounting recess from the first side, to the front portion, to the second side.

12. The mower of claim 11, wherein the second light source comprises light-emitting diodes (LEDs) mounted to the PCB.

13. The mower of claim 8, wherein the headlight assembly further comprises a lens mounted to the cover member such that the lens covers the second light source.

14. The mower of claim 13, wherein the lens curves around a lower side of the aperture and does not cover the aperture.

15. A headlight assembly for a mower, the headlight assembly comprising:
   a cover member defining an aperture, the cover member having a front portion, a first side extending from the front portion, and a second side, opposite the first side, also extending from the front portion, wherein the cover member further comprises a mounting recess that extends from the first side, across the front portion, to the second side;
   a first light source adapted to be at least partially received within the aperture, wherein the first light source is configured to illuminate a first area in front of the mower;
   a second light source coupled to the cover member, the second light source being disposed within the mounting recess of the cover member and extending from the first side, across the front portion, to the second side of the cover member, wherein the second light source is configured to illuminate a second area extending at least partially around the mower; and
   a lens mounted to the cover member such that the lens covers the second light source.

16. The headlight assembly of claim 15, wherein the lens curves around a lower side of the aperture and does not cover the aperture.

17. The headlight assembly of claim 15, wherein the second area extends in an angular range of more than 180 degrees.

18. The headlight assembly of claim 15, wherein the first light source comprises a lamp.

19. The headlight assembly of claim 15, wherein the second light source comprises a printed circuit board (PCB).

20. The headlight assembly of claim 19, wherein the second light source comprises light-emitting diodes (LEDs) mounted to the PCB.

* * * * *